June 29, 1926.
C. BLONIGEN
GLARESHIELD ATTACHMENT FOR AUTOMOBILE WINDSHIELDS
Filed Oct. 31, 1924
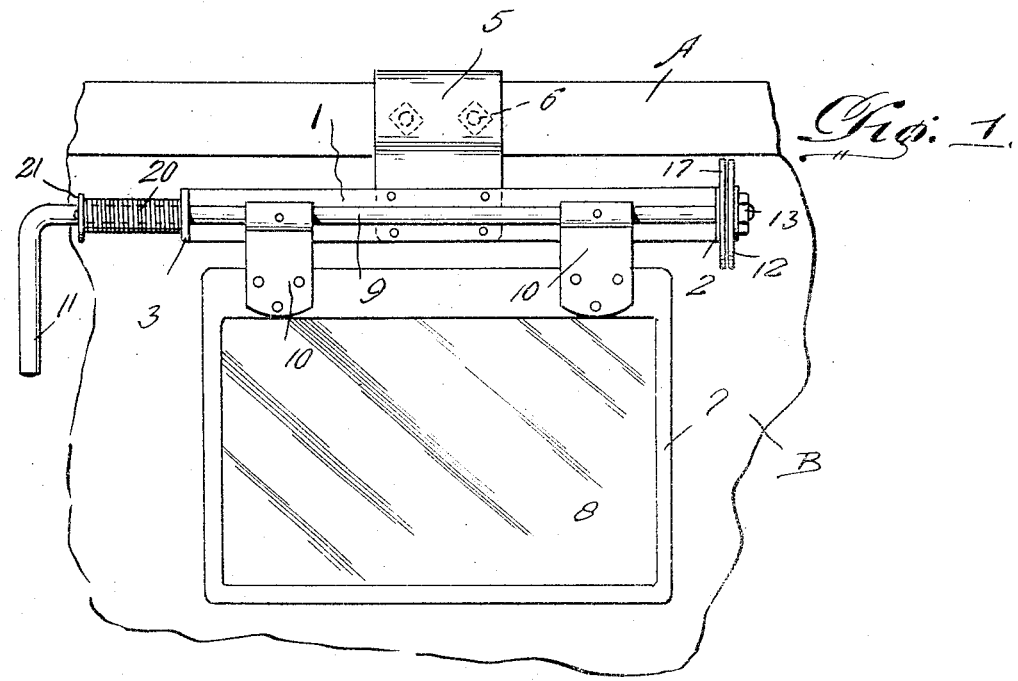
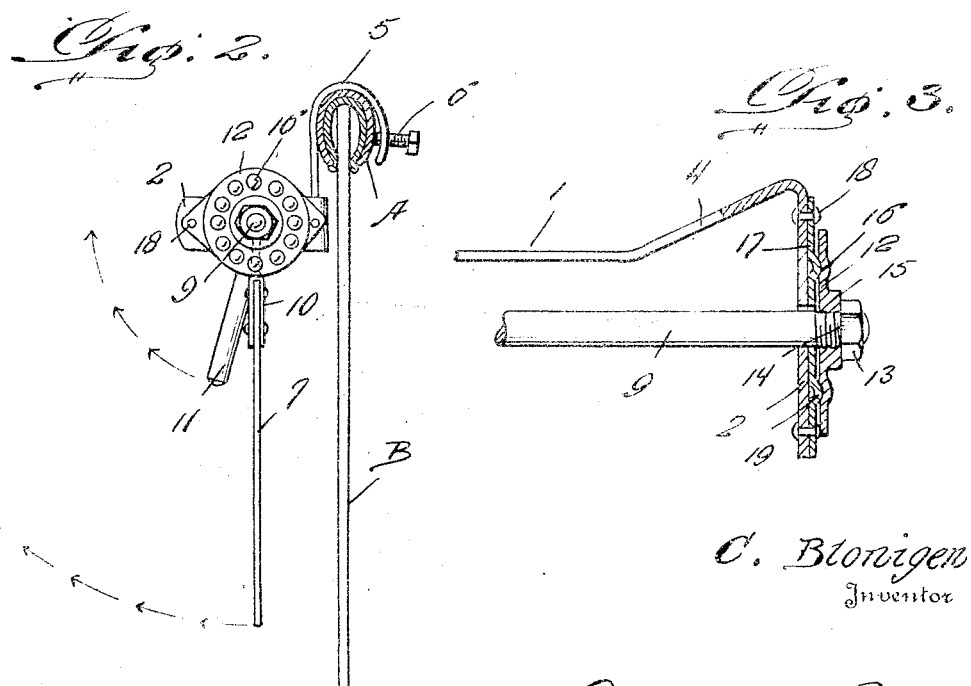
C. Blonigen
Inventor Patented June 29, 1926.

1,590,562

UNITED STATES PATENT OFFICE.

CHRISTOPHER BLONIGEN, OF MELROSE, MINNESOTA.

GLARESHIELD ATTACHMENT FOR AUTOMOBILE WINDSHIELDS.

Application filed October 31, 1924. Serial No. 747,057.

This invention relates to improvements in glare shields, and has reference more particularly to an attachment adapted to be associated with the windshield of an automobile, whereby the driver will be protected from the flare of the headlights of approaching vehicles, as well as from the sun rays.

A further object of the invention is to provide a glare shield attachment of the above mentioned character, wherein means is associated therewith for supporting the visor or screen, in a desired adjusted position, with respect to the windshield.

A further object of the invention is to provide a glare shield attachment of the above mentioned character, which is of such construction as to permit the same to be readily and easily attached in position, on the windshield frame of an automobile, without necessitating any alteration of the parts of the automobile.

A still further object is to provide a glare shield attachment of the above mentioned character, which is simple in construction, inexpensive, strong and durable, and further well adapted for the purposes for which it is designated.

Other objects and advantages of this invention will become apparent during the course of the following description.

In the accompanying drawing, forming a part of this specification, and in which like numerals designate like parts throughout the same:

Figure 1 is a front elevation of the glare shield, embodying my invention, showing the same attached in position on a windshield frame.

Figure 2 is a side elevation thereof, and

Figure 3 is an enlarged fragmentary sectional view of the locking feature.

In the drawing, wherein for the purpose of illustration is shown the preferred embodiment of my invention, the numeral 1 designates an elongated flat metallic bar, the ends of which are disposed laterally as illustrated at 2 and 3 respectively. The end 2 is of greater length than the laterally extending end 3, and the portion of the bar 1 adjacent the end 2 is bent, as illustrated at 4. Secured to the intermediate portion of the flat bar 1 is an attaching bracket, designated by the numeral 5, the same being adapted to extend over the upper edge of the windshield frame A, and supported in position thereon, by means of the set screws 6, in the manner as more clearly illustrated in Figure 2. It is of course, to be understood, that when the glare shield is associated with a closed car, a different attaching bracket is provided.

The glare shield per se, comprises a rectangular frame 7, in which is supported the visor shield, and the latter may be constructed either of a colored celluloid or colored glass, and is indicated by the numeral 8. The frame 7 is secured to a shaft 9, which extends through a pair of registering openings provided in the laterally extending ends 2 and 3 of a flat bar 1, by means of the clamping member 10, secured to the upper portion of the frame 7 adjacent the respective ends thereof.

One end of the shaft 9 terminates in a downwardly extending handle portion 11, for facilitating the rotation of the shaft, in the laterally extending ends of the bar 1, in the manner to be presently described. The opposite end of the shaft 9 supports thereon the threaded circular plate or disc 12, a nut 13 being threaded on the threaded end 14 of the shaft 9, and engaging the hub portion 15 of the circular plate 12, for preventing the displacement of the plate, from the end of the shaft. An annular series of detents, such as are shown at 16, are provided in the inner face of the plate, and the purpose thereof will be presently apparent.

A complementary circular plate 17 is disposed over the outer end of the shaft 9, and is secured to the outer face of the laterally extending end 2 of the flat bar 1, by any suitable fastening means, such as is shown at 18. The plate 17 will thus be disposed between the end 2 of the bar 1, and the circular plate 12 as clearly illustrated in Figure 3.

Formed in the outer face of the circular plate 17 are an annular series of protuberances 19, the same being adapted for cooperation with the annular series of detents 16 formed in the inner face of the circular plate 12. The protuberances 19 are normally held in engagement with the detents 16, by means of the coil spring 20, which encircles the shaft 9, and is disposed between the laterally extending end 3 of the flat bar 1, and a suitable washer 21 secured on the shaft 9, adjacent the handle portion 11, in the manner as more clearly illustrated in Figure 1. The protuberances 19 are disengaged from the detents 16, by moving the shaft longitudinally in such a manner as to compress the coil spring 20, and move the circular plate 12, supported on the threaded end 14 of the shaft 9 outwardly from the circular plate 17, secured to the outer face of the laterally extending end 2 of the flat bar 1. When the handle 11 is released, the coil spring 20 will return to its normal position, causing the circular plate 12 to move inwardly toward the plate 17, and again cause the protuberances to be seated in the detents.

When the locking means is in an inoperative position, the frame 7, which carries the glare screen or visor may be swung in a vertical plane, so that the same may be positioned in front of the windshield B, when in a vertical position, and when in a horizontal position, the shield 8 is rendered inoperative. The locking means, above described, will hold the frame 7, in any desired adjusted position with respect to the windshield.

It will thus be seen from the foregoing description that a glare shield attachment has been provided, which may be readily and easily secured in position on the windshield frame of an automobile, and when disposed in the position, as shown in the drawing, the operator of the automobile would be protected from the glare of the headlights of approaching vehicles, as well as from the sunrays. This will prevent any possibility of an accident, which would ordinarily result by the confusion of glaring headlights, such as frequently happens. Furthermore, the simplicity with which my device is constructed enables the same to be readily actuated, for moving the same either into an operative or inoperative position.

While I have shown the preferred embodiment of my invention, it is to be understood that various changes in the size, shape and arrangement of parts, may be resorted to, without departing from the spirit of the invention, and the scope of the appended claim.

Having thus described my invention, what is claimed is:

A device of the class described comprising a flat bar, the ends thereof being disposed laterally, an attaching bracket associated with the intermediate portion of the bar, for supporting the device on the windshield frame of an automobile, a shaft extending through the laterally extending ends of the bars and adapted for slidable and rotatable movement therein, a handle formed on one end of the shaft, a glare screen secured to the shaft between the laterally extending ends of the bar, a circular plate secured on the opposite end of the shaft adjacent the outer face of the adjacent laterally extending end of the flat bar, said plate having an annular series of detents formed in the inner face thereof, a complementary plate secured on the outer side of said laterally extending end of the bar, an annular series of protuberances formed on the outer face of the last mentioned plate, and adapted for locking engagement with said detents, whereby the shaft and the glare screens are held in predetermined positions, and a coil spring encircling the shaft adjacent the handle formed on one end thereof, one end of the coil spring engaging the other laterally extending end of the flat bar, and a washer on said shaft in cooperation with the opposite end of the coil spring, said coil spring normally holding the protuberances in locking engagement with the detents.

In testimony whereof I affix my signature.

CHRISTOPHER BLONIGEN.